United States Patent Office 2,871,204
Patented Jan. 27, 1959

---

2,871,204

METHOD OF PRODUCING GRANULAR COMPOSITIONS OF ACRYLATE SALT, SAND, AND CLAY AND PRODUCT RESULTING THEREFROM

Robert P. Hopkins, Ardsley, Pa., assignor to Rohm & Haas Company, Philadelphia, Pa., a corporation of Delaware No Drawing. Application August 17, 1954
Serial No. 450,555

11 Claims. (Cl. 260—2.2)

This invention relates to the production of granular compositions comprising polymers of divalent metal salts of acrylic acid.

Various uses are known for calcium polyacrylate which depend upon the ability of such polymers to undergo ion-exchange involving the substitution of the cation with other polyvalent cations. Some of the uses also involve the property or capacity of the calcium polyacrylate to adsorb or absorb elemental metals such as silver, copper, iron and nickel. The ion-exchange of the calcium polyacrylate involving the substitution of the calcium with such metals as platinum, vanadium and iridium produce materials useful for catalytic purposes. The exchange of the calcium for other metals such as copper, cobalt, nickel, magnesium, manganese and the like is employed to provide a material adapted to supply plant nutrients, such as fertilizers and trace metals needed to promote the best growth of plants. Calcium polyacrylate may also be provided in suitable sheaths or pockets in wrappers or holders for enclosing silverware to prevent tarnishing of the silver therein. The adsorption of metal, such as copper and silver either molecular or colloidal in size, adapts the calcium polyacrylate so modified for uses where biocidal activity is important especially for the oligodynamic sterilization of aqueous or other media.

However, the forms in which calcium polyacrylate has previously been prepared have certain disadvantages for application in many of these various fields of utility. For example, in many of these uses, a high surface area is desirable but the use of pulverized calcium polyacrylate in aqueous media has the disadvantage that shortly after its initial exposure to the aqueous system, the material becomes gummy and gradually packs into an adhered mass or aggregate with greatly reduced surface area.

It is the primary object of the present invention to provide an improved granular composition comprising polymers of the acrylic acid salts of calcium and other divalent metals of group II of the periodic table. The improved compositions are characterized by large surface area and reduced or completely eliminated tendency to gum up when in an aqueous medium whereby the large surface area is substantially or completely retained even in aqueous media under normal conditions of use therein. Surprisingly, the mechanical reduction in size of the polymer required to provide the sub-divided particles with an increased total surface area is obtained without encountering the normally expected increased tendency of the polymer particles to gum up on mere contact even though the granular product shows markedly increased hydration. Another object is to provide methods for producing the new granular compositions. Other objects and advantages of the invention will be apparent from the description thereof hereinafter.

In accordance with the invention, there is provided a granular composition, comprising a major proportion of a water-insoluble inorganic siliceous particulate substance and a minor proportion of a polymeric divalent metal salt of acrylic acid, in the form of granules comprising a plurality of the inorganic particles bound together with the polymer. By making such granules with a minor proportion of the polymeric substance on the order of about 30% by weight of the granules as a maximum, the granules do not become gummy and do not pack and adhere together in such a manner as to substantially reduce the surface area of the granular aggregate when it is disposed in aqueous media during use. Furthermore, the granular compositions show a markedly increased degree of hydration at equilibrium and it has been found that this increases the rate of ion-exchange over and above the increase obtained merely as the result of increased surface area as compared to solid masses, such as films, consisting entirely of polymer made under the same conditions except for the absence of the inorganic particles. For example, a film of calcium polyacrylate made by polymerizing a 30% aqueous solution of calcium acrylate containing 0.3% of ammonium persulfate and 0.3% of sodium thiosulfate at room temperature (25° C.) absorbs or adsorbs 50.4% water when submerged therein at 25° C. to reach equilibrium. These films when laid on one another in water fuse together. A cake of calcium polyacrylate made (Example 1 hereinafter) by polymerizing a 30% aqueous solution of calcium acrylate containing 0.3% ammonium persulfate and 0.3% sodium thiosulfate in which there is suspended clay in an amount of about 7½ times the amount of calcium acrylate and sand in the amount of about 2½ times the weight of calcium acrylate, after polymerization and drying at 25° C. and then soaking in water at 25° C., contained 63% water (based on the weight of polyacrylate-water equilibrated phase) at equilibrium. When the cake was ground up, the granules after soaking in water at 25° C. to reach equilibrium contained 84–91% water (based on the weight of water and polyacrylate in the composition). Such granules however did not fuse together when resting in contact with each other in or under water.

The size of the granules may vary from about 0.1 to about 5 mm. in average diameter but a size of about 0.5–2 mm. is preferred for most purposes.

The polymers of the present invention are characterized by freedom from the permanent type of cross-linking obtained from di-ethylenically unsaturated polymerizable substances.

It has been found that in order to produce a substantially uniform granular material from which the polymer is not gradually removed by leaching or erosion in aqueous media during use, it is necessary that the polymer be formed in situ either (1) by direct polymerization of a water-soluble monomeric salt of acrylic acid in an aqueous slurry of the sub-divided inorganic particles or (2) by subsequent ion-exchange of a polymer formed as in (1) with a suitable salt. The second procedure may be used to produce polymers whose monomeric salt form is not soluble in water as well as those whose monomeric salt is soluble in water. In general, therefore, the compositions of the invention may be made by pasting or slurrying appropriate pulverized or subdivided particles of the water-insoluble inorganic substance in an aqueous solution of the acrylic acid salt of the divalent metal to which has been added in separate solutions, preferably saturated, suitable proportions of one or more polymerization catalysts or catalyst components. The mixture is then polymerized and the resulting mass is disintegrated or broken up to the desired size, preferably after drying. The polymerized mass may be roughly broken up while still wet and then finally ground after drying. Optionally but not necessarily, the sub-divided product is screened or otherwise sorted into one or more size classifications.

The particulate inorganic material is an essential part of the aggregate matrix, providing mechanical strength even when the granules are in hydrated condition, and it controls and limits swelling or volume changes so as to minimize the development of shrinkage cracks or disintegration of the granules on repeated hydration-dehydration cycles. As such inorganic material, there may be used any water-insoluble siliceous inorganic or mineral substance whether naturally or artificially produced. Among the most common of such materials are the various silicas or silicates including all types of sands and natural silicates, such as beryl, zircon, pumice, the various micas, slags, glasses, and all sorts of clays, such as kaolin or bentonite. Of the various substances listed, it is preferred that the mixture comprise at least some proportion of clay because of (1) its binding action to itself and to any other of the inorganic materials used, and (2) because of the assistance obtained from the clay in maintaining the inorganic material in suspended condition in the polymerization system. From the point of view of economy, mixtures comprising sand are also generally desirable although this may not be true in some localities where other materials may be more readily available and less expensive. Regardless of the inorganic siliceous material selected, it must be used in a condition of sub-division. The extent of sub-division may be that in which it occurs naturally or in which it is normally produced, or it may be specially pulverized by grinding, milling, or the like to the desired size. Preferably, the sub-division of the inorganic material is such that, or is carried to a point where, its size is considerably smaller than the size of the granules ultimately desired in the final granular composition. By so controlling the condition of sub-division of the carrier, it is assured that the ultimate granules obtained do not consist merely of inorganic particles individually coated with polymer. Instead, each granule of the ultimate granular composition consists of a plurality and preferably a great multiplicity of the particles of the inorganic material connected together by the polymer.

The acrylic acid salts contemplated by the invention include those of the second group of the periodic table and especially those of magnesium, calcium, strontium, zinc, and barium. These specifically mentioned salts are sufficiently soluble in water to be polymerized in aqueous slurries or pastes of the inorganic siliceous particles. Polymers of water-insoluble divalent metal acrylates may be obtained by ion-exchange from the polymers derived from the granular composition comprising the polymers mentioned above. The monomeric acrylic acid salt may be used in proportions of 3 to 30 parts by weight with from 97 to 70 parts respectively of the finely divided inorganic material, the proportions that may be used in any particular case being dependent on the particular inorganic material or materials used. Generally, the acrylic acid salt of the divalent metal is first dissolved in water in a proportion of 5% to saturation and preferably in a proportion of at least 20% by weight of the solution and a catalyst is added thereto. Then the pulverulent inorganic materials are introduced into the solution in the desired proportion within the limits defined above. The resulting paste or slurry is mixed thoroughly and polymerized. To simplify subsequent breaking up or disintegration of the polymerized mass, it is preferred to cast the slurry or paste into a mold adapted to form slabs or sheets which are readily broken up.

The polymerization catalyst may be of the free radical type such as acetyl peroxide, t-butyl hydroperoxide, or one of the persulfates such as ammonium, potassium, or sodium persulfate used in amounts of about ½ to 10% based on the weight of monomer. A redox system may be used in which the catalyst, especially the persulfate catalyst, may be used in conjunction with a reducing agent such as sodium thiosulfate or sodium hydrosulfite. Copper, iron, and lead salts may be used in small amounts to activate the persulfate catalyst. The amounts of such salts may be from 0.1 to 0.3% based on the weight of monomer.

The temperature of polymerization may vary from about −12° C. to 100° C. or higher, the temperature in any case being above the freezing point of the monomer-containing dispersion. A system catalyzed simply by one of the persulfates can be used effectively at high temperatures such as 80° C. to 110° C. The preferred catalyst system, especially at or below room temperature, is that using a persulfate for initiating polymerization in conjunction with a reducing agent for accelerating the reaction (the redox system) because of the more rapid polymerization that can be obtained thereby. However, acetyl peroxide is also useful at room temperature. The time required for the polymerization may vary from a few minutes up to overnight depending upon the monomer concentration, catalyst type, temperature and so on. In a preferred system, polymerization is carried out at low temperatures such as at room temperature or 10° to 15° C. below it and after coalescence of the polymerized mass at such low temperature the disintegration or grinding is carried out while maintaining the temperature as low as possible, preferably such that the temperature does not exceed 40° C. when the calcium salt is involved and does not rise above room temperature when strontium, zinc, and barium salts are involved. Optimum results are obtained when the temperature of all operations after polymerization are maintained within 0° C. to 5° C. except in the case of the magnesium acrylates.

After polymerization and preferably after drying, the mass comprising the inorganic particles and the polymer is disintegrated by any suitable grinding or milling machine. After grinding, the dry granular material may be screened to classify it into several sizes and any material that is still oversize may be returned for re-grinding. The size of granules in preferred compositions may vary widely. Generally, it may be such that the granules all pass a 4-mesh to a 100- or 150-mesh screen, depending upon the purpose for which the particular mass is desired. In any given size classification, fines may be reduced by removing the material that passes through a screen having a smaller mesh opening than that of the largest through which the granular composition is passed initially.

The following examples are illustrative of the invention:

*Example 1*

A solution in water of 30% by weight calcium acrylate was made and a saturated solution of ammonium persulfate was added to introduce 0.3% by weight of the persulfate. A similar proportion of sodium thiosulfate was similarly introduced. A mixture of 17.85 g. of kaolin and 53.55 g. of sand, both in finely divided condition such that they passed through a 70-mesh screen, was mixed into 28.6 cc. of the calcium acrylate solution and the mixture was placed in a mold adapted to form a cake. The molded mass was allowed to polymerize at 24° C. and after two hours the molded material was cut into irregular pieces of ½ to 1 inch breadth. Thereafter the cut mass was allowed to dry for 48 hours under conditions at room temperature. After drying, the mass was ground in a Wiley mill to pass a 6 mm. sieve. From the sievings, further screening was performed to produce a fraction having sizes from 1 to 2 mm. and another fraction having sizes from ½ to 1 mm. The fractioned elements were washed and dried further for 16 hours at 32° C. The product contained 9.4% calcium polyacrylate by weight. The granules in the compositions were hard when dry, substantially free of dust, and when soaked in water they retained granular individuality. As pointed out hereinabove, the calcium polyacrylate in the granular material acquired a higher percentage (84–91%) of water at equilibrium than the polymerized mass before breaking up which contained only 63% water at equilibrium.

Example 2

The procedure of Example 1 was carried out except the proportion of kaolin and sand were reversed. Thus, 53.55 g. of kaolin and 17.85 g. of sand were mixed into the initial calcium acrylate slurry. A similar hard granular product was obtained which retained its granular character even after soaking in water.

Example 3

A mixture of 75 parts of sand and 25 parts of kaolin, in a state of sub-division such as to pass a 70-mesh screen, was slurried in 28 parts by weight of a 20% solution of calcium acrylate containing 1% by weight of potassium persulfate and 1% by weight of sodium thiosulfate (the percentages of persulfate and thiosulfate being based on calcium acrylate). The mixture was molded, polymerized, pulverized and screened as in Example 1. The product contained 5.3% by weight of calcium polyacrylate and was a hard, dry, granular composition which retained its granular character even after soaking in water.

Example 4

To 70.7 parts by weight of a 30% calcium acrylate solution and 1% of ammonium persulfate and 1% of sodium thiosulfate (the percentages of sulfate and thiosulfate being based on the calcium acrylate), a mixture of 100 parts of finely divided sand and kaolin containing 25 parts by weight of sand and 75 parts by weight of kaolin was added and thoroughly mixed in. The mixture was molded and polymerized and otherwise treated as in Example 1. The product contained 17.5% calcium polyacrylate, and its granules retained their granular character even after soaking.

Example 5

To 45 parts by weight of the catalyzed 22% calcium acrylate solution made up as in Example 1, 100 parts by weight of a mixture of sand, kaolin, and bentonite (in weight proportions of 25:7:5) was added and the mixture stirred. The mixture was placed in a mold and polymerized and subsequently treated as in Example 1. The granular product was a hard, dry composition and it retained its granular character even after soaking in water.

Example 6

There was made up in a solution in water containing 40% by weight of magnesium acrylate and containing 0.4% by weight each of ammonium persulfate and sodium hydrosulfite. To 18.8 parts of this solution, 75 parts by weight of a mixture of bentonite and sand in a 1 to 10 ratio was added and mixed in thoroughly. The resulting slurry was molded, polymerized, subdivided and dried as in Example 1. The product obtained was granular in character, and retained its granular character in water.

Example 7

An aqueous solution containing 25% of barium acrylate was produced and potassium persulfate and sodium thiosulfate were added in proportions amounting to 1% by weight of the barium acrylate. To 40 parts of the solution, 85 parts of a mixture of sand and clay in 1:1 ratio (having a size which passed a 32-mesh screen) was added and thoroughly mixed. The procedure of Example 1 was applied to the resulting slurry for producing a dried granular composition. The granular composition obtained retained its granular character even in water.

Example 8

An aqueous solution containing 28% of zinc acrylate and 2% by weight of ammonium persulfate and 2% by weight of sodium thiosulfate (the persulfate and thiosulfate percentages being based on zinc acrylate) was made up. To 65 parts by weight of the zinc acrylate solution, 185 parts of a mixture of sand and clay in a 1:1 ratio (pulverized to pass a 32-mesh screen) was added and thoroughly mixed. The slurry was then treated as in Example 1 to produce several fractions of granular material. The granular composition comprised hard granules which retained their granular form even in aqueous solution.

All of the granular compositions obtained by the examples hereinabove exhibited rapid and efficient ion-exchange activity, not only because of their increase in exposed area but also because of the surprising fact that fusion does not occur in the presence of water in spite of the greater hydration obtained in the granular form. Their efficiency was retained over long periods because of their freedom from tendencies to gum up and pack together when disposed in the aqueous solutions used for the ion-exchange operations.

It is to be understood that changes and variations may be made without departing from the spirit and scope of the invention as defined in the appended claims.

I claim:

1. A method of producing a granular composition comprising preparing an aqueous solution containing dissolved therein, at a concentration of 5% up to saturation, 3 to 30 parts by weight of a salt of acrylic acid with a divalent metal selected from the group consisting of calcium, magnesium, strontium, zinc, and barium, introducing ½ to 10%, based on the weight of salt, of a polymerization catalyst to polymerize the salt, mixing therein 97 to 70 parts by weight of particles of a mixture consisting of sand and clay in a range of weight ratios from about 1:3 to 10:1 to form a slurry, completing the polymerization of the acrylate in the slurry at a temperature between about −12° C. and 110° C. until a coalesced mass is obtained, and subsequently sub-dividing the polymeric mass containing the inorganic particles into granules of about 0.1 to about 5 mm. average diameter in size.

2. A method as defined in claim 1 in which the acrylate is calcium acrylate.

3. A method as defined in claim 1 in which the acrylate is calcium acrylate and the inorganic substance is a mixture containing sand and kaolin in a weight ratio of 3:1.

4. A method of producing a granular composition comprising preparing an aqueous solution containing dissolved therein, at a concentration of 5% up to saturation, 3 to 30 parts by weight of a salt of acrylic acid with a divalent metal selected from the group consisting of calcium, magnesium, strontium, zinc, and barium, introducing ½ to 10%, based on the weight of salt, of a polymerization catalyst to polymerize the salt, mixing therein 97 to 70 parts by weight of particles of a mixture consisting of sand and clay in a range of weight ratios from about 1:3 to 10:1 to form a slurry, completing the polymerization of the acrylate in the slurry at a temperature between about room temperature and about 15° C. below it and subsequently sub-dividing the polymeric mass containing the inorganic particles into granules of about 0.1 to about 5 mm. average diameter in size, the sub-dividing being effected at a temperature not exceeding 40° C.

5. A process as defined in claim 4 in which the temperature is maintained within the range of 0° C. and 5° C. during the drying and sub-dividing operations which are effected after polymerization.

6. A granular ion-exchange resin composition, the granules of which are of a size of about 0.1 to 5 mm. average diameter and are formed of a plurality of inorganic particles bound together with a polymer of a salt of acrylic acid with a divalent metal selected from the group consisting of calcium, magnesium, strontium, zinc, and barium, said composition being obtained by the process of claim 1.

7. A composition as defined in claim 6 in which the divalent metal is calcium.

8. A composition as defined in claim 6 in which the divalent metal is magnesium.

9. A composition as defined in claim 6 in which the divalent metal is barium.

10. A composition as defined in claim 6 in which the divalent metal is zinc.

11. A composition as defined in claim 6 in which the divalent metal is strontium.

References Cited in the file of this patent

UNITED STATES PATENTS

| | | |
|---|---|---|
| 2,401,348 | Hauser et al. | June 4, 1946 |
| 2,502,411 | Neher et al. | Apr. 4, 1950 |
| 2,651,619 | De Mallo et al. | Sept. 8, 1953 |